United States Patent
Beideman et al.

(10) Patent No.: US 9,843,145 B2
(45) Date of Patent: Dec. 12, 2017

(54) THERMAL SAFETY PLUG FOR AN ELECTRIC APPLIANCE

(71) Applicant: Lasko Operation Holdings, LLC, Wilmington, DE (US)

(72) Inventors: Gary S. Beideman, West Chester, PA (US); Vincent Jacob, Philadelphia, PA (US)

(73) Assignee: Lasko Operation Holdings, LLC, Wilmington, DE (US)

( * ) Notice: Subject to any disclaimer, the term of this patent is extended or adjusted under 35 U.S.C. 154(b) by 0 days.

(21) Appl. No.: 15/262,829

(22) Filed: Sep. 12, 2016

(65) Prior Publication Data
US 2017/0077656 A1    Mar. 16, 2017

Related U.S. Application Data

(60) Provisional application No. 62/217,065, filed on Sep. 11, 2015.

(51) Int. Cl.
| | |
|---|---|
| *H01R 13/713* | (2006.01) |
| *H01H 37/74* | (2006.01) |
| *H02H 5/04* | (2006.01) |
| *H01R 24/30* | (2011.01) |
| *H01R 13/504* | (2006.01) |
| *H01R 103/00* | (2006.01) |
| *H01R 13/512* | (2006.01) |

(52) U.S. Cl.
CPC ......... *H01R 13/7137* (2013.01); *H01H 37/74* (2013.01); *H02H 5/047* (2013.01); *H01R 13/504* (2013.01); *H01R 13/512* (2013.01); *H01R 24/30* (2013.01); *H01R 2103/00* (2013.01)

(58) Field of Classification Search
CPC .. H01R 13/7137; H01R 13/504; H01H 37/74; H01H 5/047
USPC ............................................. 439/620.21, 625
See application file for complete search history.

(56) References Cited

U.S. PATENT DOCUMENTS

| | | | | |
|---|---|---|---|---|
| 4,763,365 | A * | 8/1988 | Gerondale | H02H 3/334 324/509 |
| 5,188,542 | A * | 2/1993 | Ballman | H01R 13/6691 439/465 |
| 5,590,010 | A * | 12/1996 | Ceola | H01R 13/7137 337/13 |
| 5,600,306 | A * | 2/1997 | Ichikawa | H01R 13/7137 337/1 |
| 5,725,393 | A * | 3/1998 | Steininger | H01R 13/5025 439/597 |
| 5,742,464 | A * | 4/1998 | Ceola | H01R 13/7137 361/103 |
| 6,072,152 | A * | 6/2000 | Landry | H05B 1/02 219/202 |
| 6,210,036 | B1 * | 4/2001 | Eberle | H01R 13/6683 337/2 |

(Continued)

*Primary Examiner* — Alexander Gilman
(74) *Attorney, Agent, or Firm* — Pepper Hamilton LLP

(57) ABSTRACT

A thermal detection plug for use with an electrical apparatus is provided. The thermal detection plug includes: a housing, a thermal cut-off, contact prongs, and supporting structures to effectively interrupt the flow of electrical power at the point of interface of between the power cord of an appliance and power receptacle. The thermal detection plug interrupts power based on a temperature detected at the interface point.

25 Claims, 11 Drawing Sheets

(56) References Cited

U.S. PATENT DOCUMENTS

| | | | | |
|---|---|---|---|---|
| 6,218,844 B1* | 4/2001 | Wong | ............... | G01R 31/3272 |
| | | | | 324/424 |
| 6,603,385 B2* | 8/2003 | Kitchens | ............. | H01H 37/761 |
| | | | | 337/407 |
| 7,005,591 B1* | 2/2006 | Fleury | ............... | H01R 13/5213 |
| | | | | 200/51 R |
| 7,446,643 B2* | 11/2008 | Lee | ............... | H01H 1/504 |
| | | | | 337/100 |
| 8,159,803 B2* | 4/2012 | Ward | ............... | H01R 13/7135 |
| | | | | 361/103 |
| 8,605,402 B2* | 12/2013 | Ward | ................ | G01K 3/005 |
| | | | | 361/103 |
| 8,777,646 B2* | 7/2014 | Doubt | ............... | H01R 13/7137 |
| | | | | 439/265 |
| 8,922,967 B2* | 12/2014 | Goelz | ............... | H01R 13/6683 |
| | | | | 361/103 |

* cited by examiner

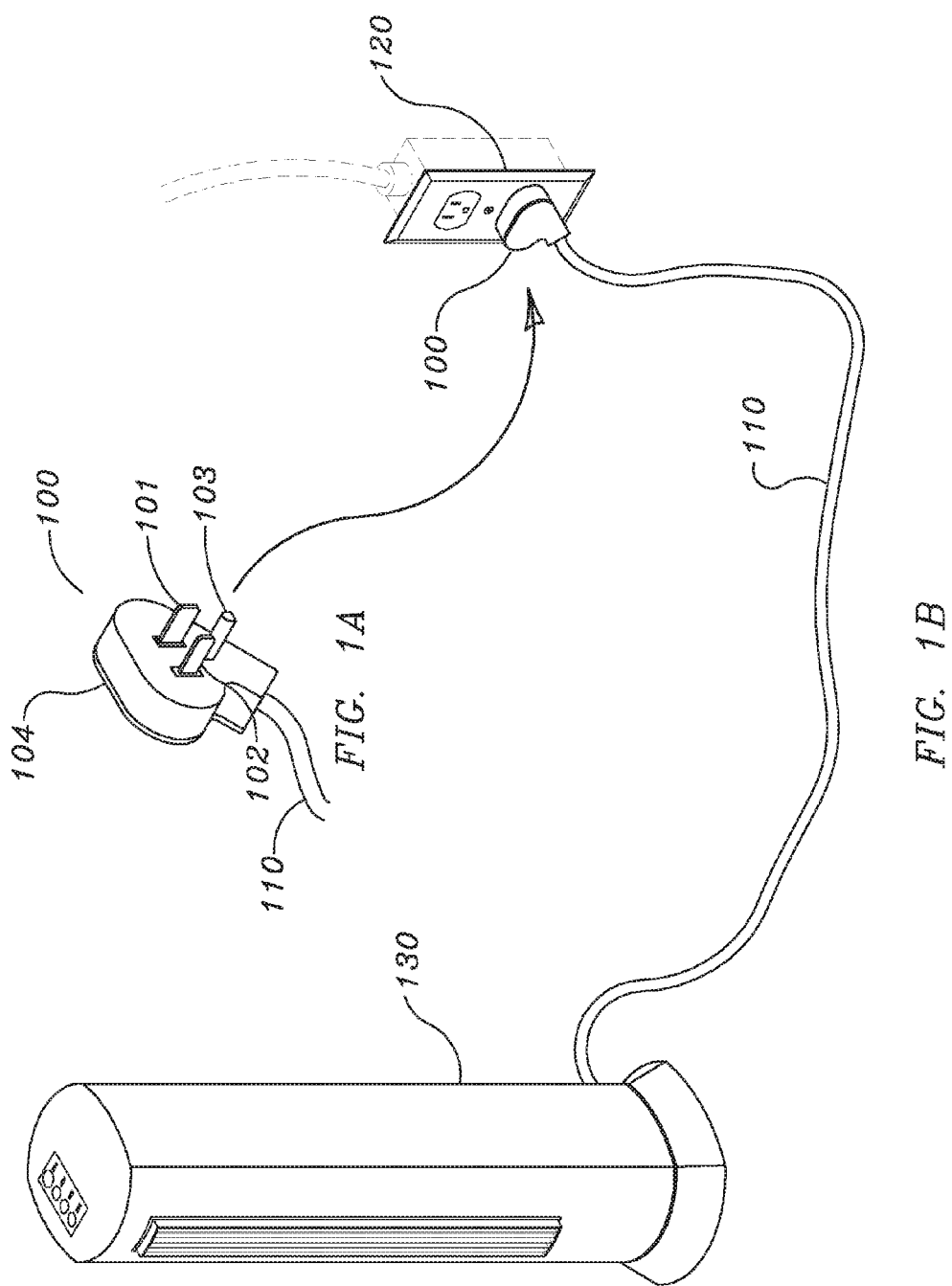

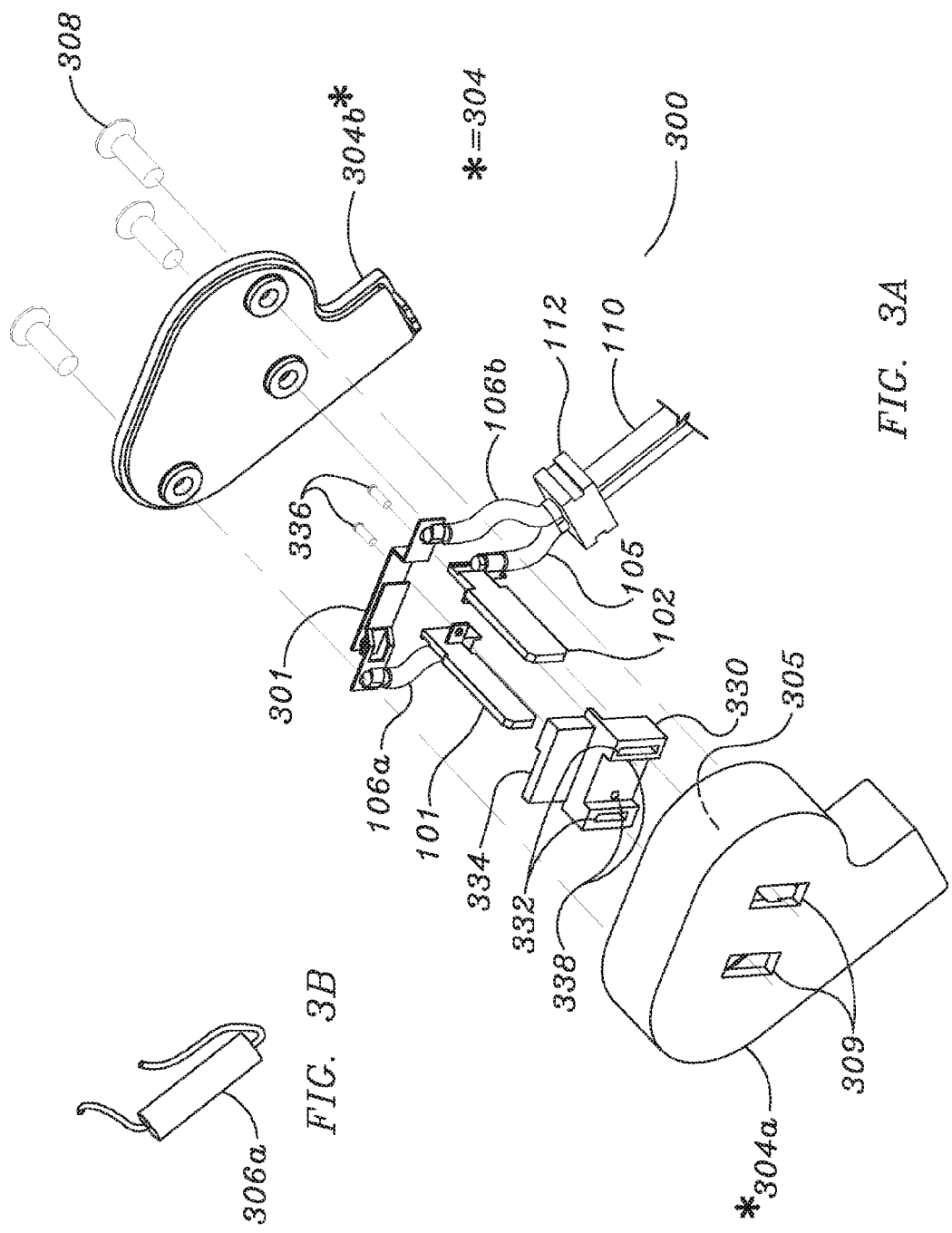

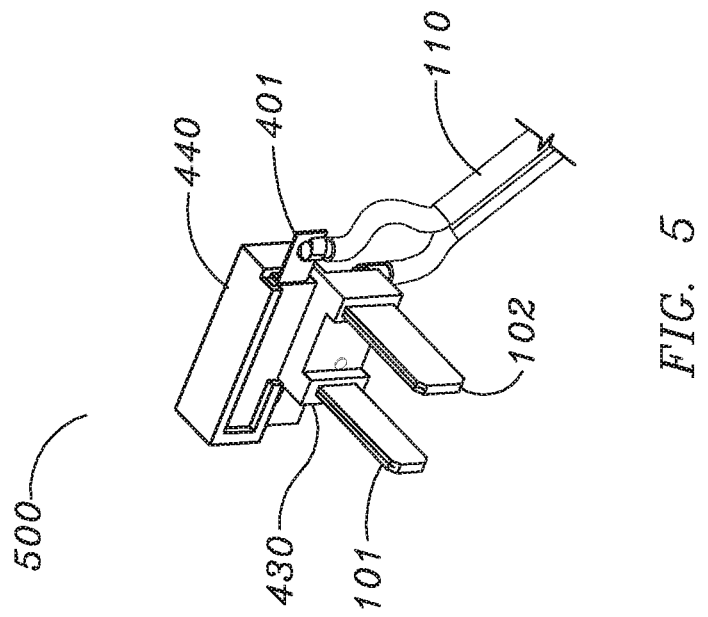
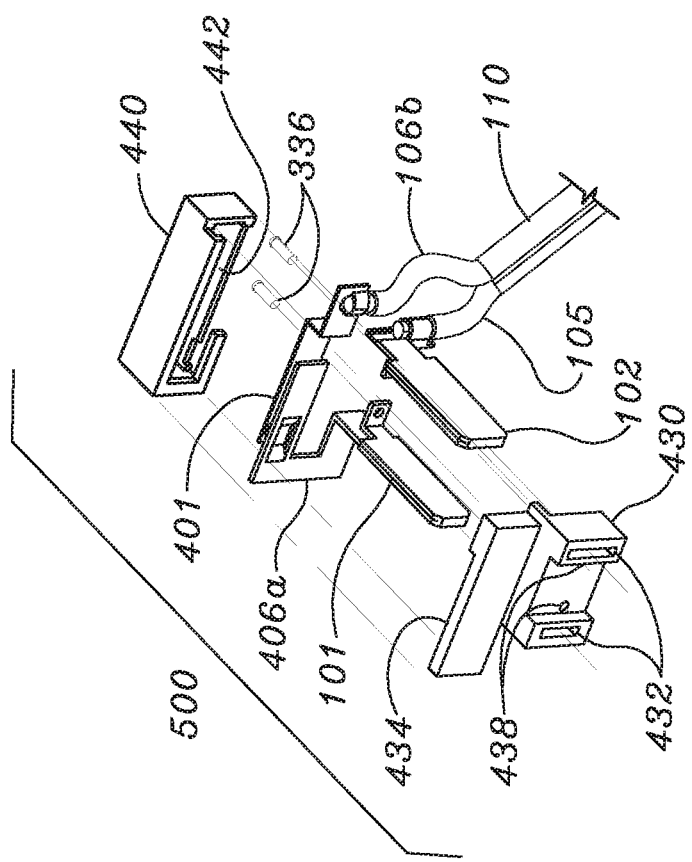
FIG. 5
FIG. 4

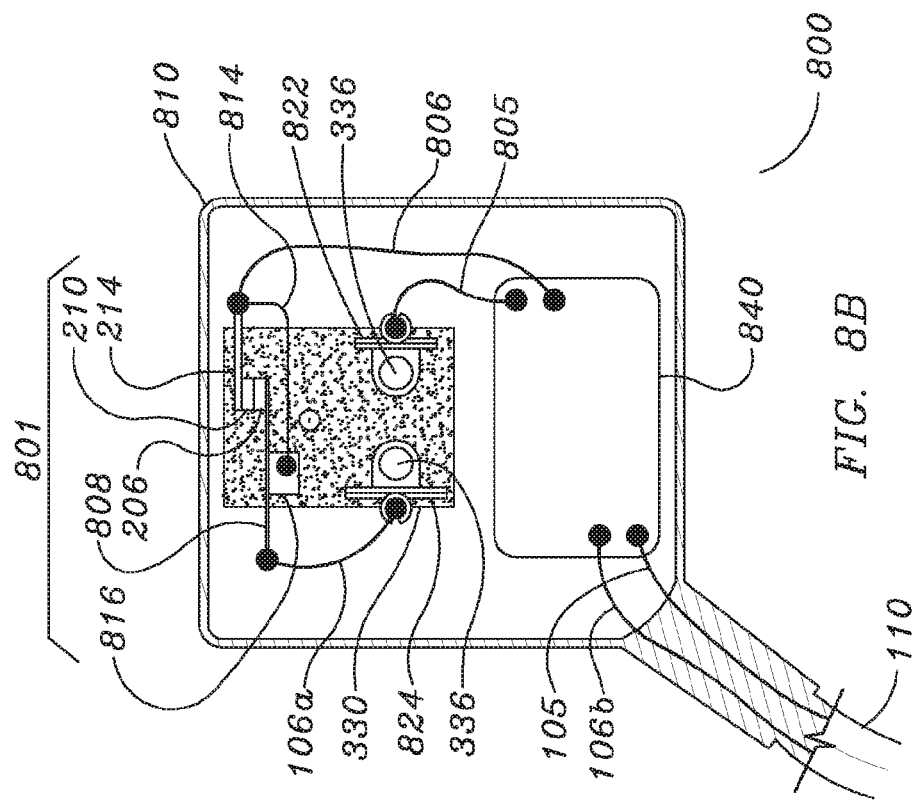
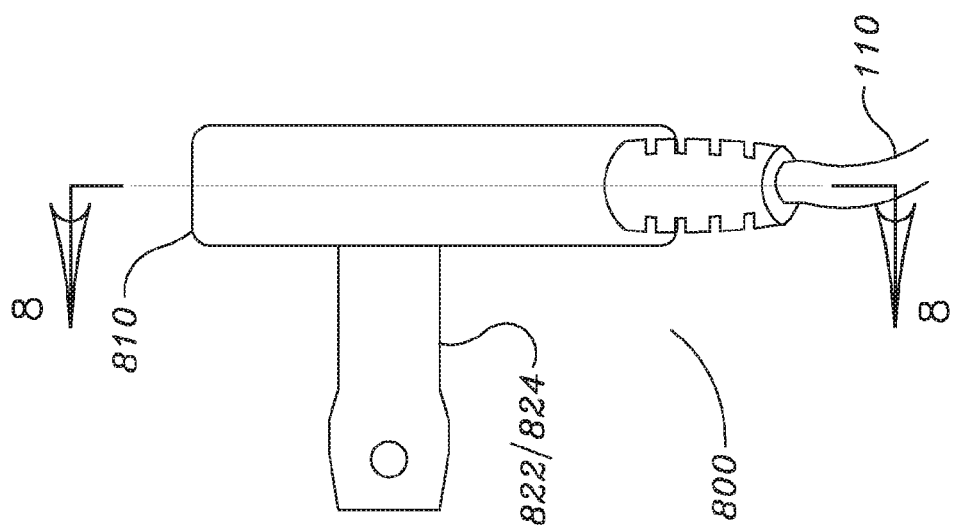

THERMAL SAFETY PLUG FOR AN ELECTRIC APPLIANCE

RELATED APPLICATION DATA

This application claims priority to U.S. provisional patent application Ser. No. 62/217,065 filed Sep. 11, 2015, the contents of which is hereby incorporated by reference in its entirety.

TECHNOLOGY FIELD

The invention is related to safety devices used on relatively high amperage appliances. More specifically, the invention relates to thermal protection located at the electrical interface between an appliance and a power source.

BACKGROUND

The increasing cost and use of energy is a global concern. One unavoidable process that uses energy is the heating of buildings and more specifically the heating of a single area or room within a building. The ability to efficiently heat a room is one way of reducing both the usage and therefore the cost of energy.

One manner to heat only a single room is to utilize a conventional space or room heater. These types of conventional heaters often have advantages over heating systems designed for an entire building. Conventional space heaters create heat within a room without the need to heat additional rooms at the same time. The ability to produce and direct a limited flow of heated air to a desired location reduces the quantity of heat needed by "spot heating" only a single location in the room. In turn "spot heating" reduces the overall needed energy.

Space heaters also eliminate the use of duct work and other permanent structures that are expensive and absorb heat. The heat absorption of duct work etc. contributes to permanent system inefficiencies.

Although conventional electric space heaters have certain advantages over other heating systems they possess several disadvantages as well. The amperage draw associated with a conventional space heater increases the load on the electrical system of the building. In some instances the electrical load generated by a conventional electric space heater can stress the components of the electrical system. For example, if the wall receptacle is old and the contact pressure between the prongs of a plug and the receptacle terminals is not sufficient, this can cause a localized heating problem within the receptacle. Many such receptacles are located behind objects, such for example, furniture, and are not easily visible to the user. The non-visibility of such receptacles impedes the ability of the user to detect problems, should they occur. This localized heating can further create a potential failure of other components in the area and a potential safety compromise.

The use of current sensing circuit interrupters have been utilized in conjunction with electrical appliances for many years. Some conventional types of circuit interruption devices include fuses, circuit breakers (re-settable and non-re-settable), ground fault circuit interrupters (GFCI), appliance leakage circuit interrupters (ALCI), and arc fault circuit interrupters (AFCI).

Conventional fuses and circuit breakers are devices that use amperage to determine the presence of an electrical fault. When excess amperage is detected by conventional fuses and circuit breakers, they respond by interrupting the flow of electric current.

GFCI devices monitor amperage flow and compare amperage flow in and out of an appliance. The GFCI device responds to a pre-determined limit of amperage flow imbalance in and out of an appliance by interrupting the flow of electric current.

AFCI devices monitor voltage and amperage signatures within the branch circuits served by a power distribution panel. Deviations from the normal signatures are monitored by electronic circuits and algorithms to determine if a fault occurs. When a fault is recognized indicating an electrical arc, the flow of electric current is interrupted to the branch circuit.

The above mentioned devices have functional limitations. Conventional current sensing circuit interrupters do not have the ability to directly detect heat build-up due to resistive heating within the appliance, the power supply and/or the interface between the appliance and the power supply. The above mentioned devices will interrupt the flow of power if the amperage/voltage exceeds a pre-determined threshold or increases too rapidly. Unfortunately, resistive heating may build up less rapidly and at current/voltage levels lower than the pre-determined limits of the above mentioned conventional devices, particularly at the interface between the appliance and the power supply. The associated heat buildup may be sufficient to compromise the safety of the appliance or electrical system. The possibility of such a compromise is especially acute on appliances that have a high amperage draw, such as a conventional space heater. This pre-determined limit renders such conventional devices ineffectual for the detection of heat that builds over time and/or levels of heating that are not accompanied by a spike in the current draw on the circuit.

SUMMARY

In view of the deficiencies of the prior art, embodiments herein provide a power interface device for use with appliances and devices that have relatively high amperage draws. A thermal detection plug, according to embodiments herein, overcomes several if not all of the prior art problems. A thermal detection plug, according to embodiments herein, is located at the power interface between the appliance (power cord) and the power supply (wall outlet or extension cord). The thermal detection plug is used to directly detect the temperature of the components at the interface, as opposed to assuming or calculating an increased temperature through the measurement of current, voltage and the like.

Tests show that a faulty connection between a prong of a conventional plug and the receptacle terminals of a conventional wall outlet can engender localized heating at this instance and/or the wall socket. A thermocouple placed within the housing of a plug near the plug prong have measured temperatures in excess of 315° C. [600° F.] during a faulty connection event. A thermocouple placed within the housing of a conventional plug measured housing material temperatures in excess of 175° C. [350° F.] during a faulty connection event. These measured temperatures may exceed the plastization threshold of polymer materials used in the construction of conventional plugs. The softening of the polymer materials compromises both the structure and the safety of conventional plugs.

The thermal deformation temperatures (the "Vicat softening temperature") of major polymers are as follows: Polystyrene 103° C. [217° F.], Acrylonitrile butadiene styrene 103° C. [217° F.], Polyvinyl Chloride 92° C. [197° F.], Polycarbonates 156° C. [313° F.], Polyethylene 127° C. [261° F.], and Polypropylene 152° C. [305° F.]. The advent of the temperatures reaching the Vicat softening temperature does not necessarily signify a compromise of the structure and the safety. The most widely used polymer for power cords and plugs is Polyvinyl Chloride (PVC) because it has desirable characteristics for such applications, however it also has one of the lowest Vicat temperatures.

The use of a thermal detection plug, according to embodiments herein, enhances the safety of the portable electric appliance by halting the flow of electricity at temperature levels lower than the above mentioned "faulty connection event". The use of inexpensive components to construct the device allows the production of the thermal detection plug at a cost that will not be a burden to the consumer. Another desirable aspect of the device is to maintain a physical size and shape that conforms or has near conformity to conventional power cord plugs, thereby eliminating the need for special adapters and additional components.

The thermal plug, according to embodiments provided herein, functions independently of any other system. In short, the thermal detection plug does not depend on subsequent systems in order to function properly. In lieu of sending a signal to a subsequent control system, such as, for example the electronics that control the appliance, the thermal detection plug is self-contained and interrupts the flow of power directly.

All of these characteristics allow the thermal detection plug to be an enhancement to the overall safety of the portable electric appliance, specifically appliances with relatively high amperage loads.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. For the purpose of illustrating the invention, there is shown in the drawings embodiments that are presently preferred, it being understood, however, that the invention is not limited to the specific instrumentalities disclosed. Included in the drawing are the following figures:

FIGS. 1A and 1B are perspective views, according to an embodiment, of a thermal detection plug used with an appliance;

FIGS. 3A and 3B illustrate characteristics of another embodiment of a thermal detection plug;

FIG. 4 is an exploded perspective view showing features of a thermal detection plug, according to an embodiment;

FIG. 5 is a perspective view showing the assembly of the exploded perspective view of FIG. 4;

FIGS. 8A and 8B are views of another embodiment of a thermal detection plug;

DETAILED DESCRIPTION

Figure 2A:
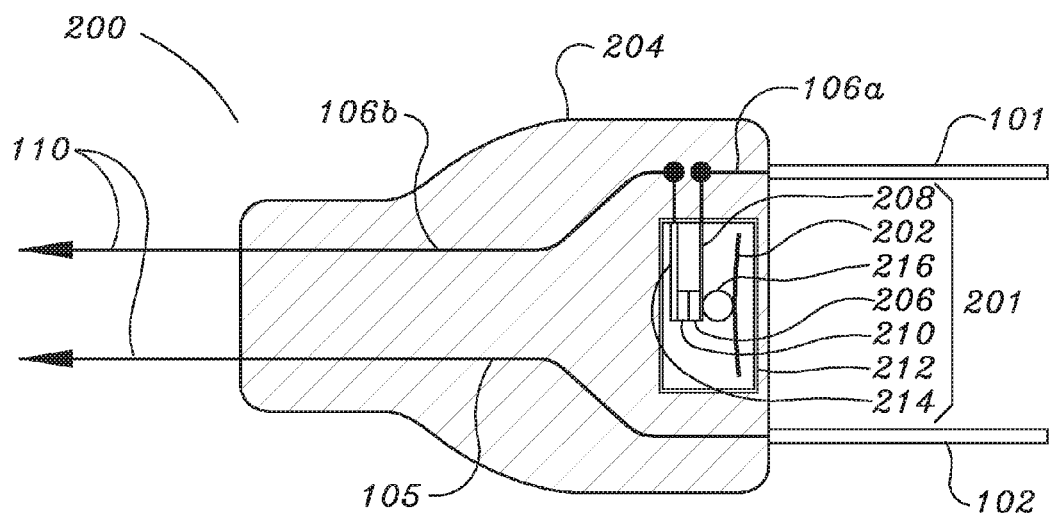
FIGS. 2A and 2B are cross sectional circuit views of a thermal detection plug, according to an embodiment.

FIG. 1A is a perspective view of thermal detection plug 100. Thermal detection plug 100 includes power source contact prongs 101, 102 and housing 104. Line cord 110 is shown exiting housing 104. Thermal detection plug 100 may include ground prong 103 as shown.

In an embodiment, thermal detection plug 100 is of a size and shape that conforms substantially to the size and shape of conventional appliance plugs. The ability to conform to the size and shape of conventional appliance plugs will contribute to the ease of application and acceptance of thermal detection plug 100 in the market. It is contemplated that the size and shape of thermal detection plug 100 may be completely different from a conventional appliance plug without departing from the spirit of the invention.

FIG. 1B shows thermal detection plug 100 connected via line cord 110 to portable electric appliance 130. Portable electric appliance 130 may be, for example, a portable electric space heater as shown. Thermal detection plug 100 engages power source 120. As shown, power source 120 is a conventional wall outlet. Power source 120 may also be an extension cord or other conventional power adaptor. The interface between thermal detection plug 100 and power source 120 is similar to the interface of a conventional appliance plug and power source 120.

The ability of thermal detection plug 100 to stop the flow of electricity from power source 120 to portable electric appliance 130, according to embodiments herein, is determined by the temperatures of both thermal detection plug 100 and power source 120. High current apparatuses are particularly susceptible to heat build-up within power supply 120 and/or the interface between the appliance 130 and the power supply 120. Heat build-up may be caused by corroded or undersized building wiring, loss of contact pressure between contact prongs 101, 102 and power source 120, and/or poor wiring connections within power source 120. The location of thermal detection plug 100 at this interface increases the safety of the entire system.

Thermal detection plug 100 is shown utilized in combination with a portable electric space heater. Other relatively high current devices, such as toasters, toaster ovens, kitchen appliances, vacuum cleaners, dehumidifiers, air conditioners and the like would also benefit from the use of thermal detection plug 100.

Figure 2B:
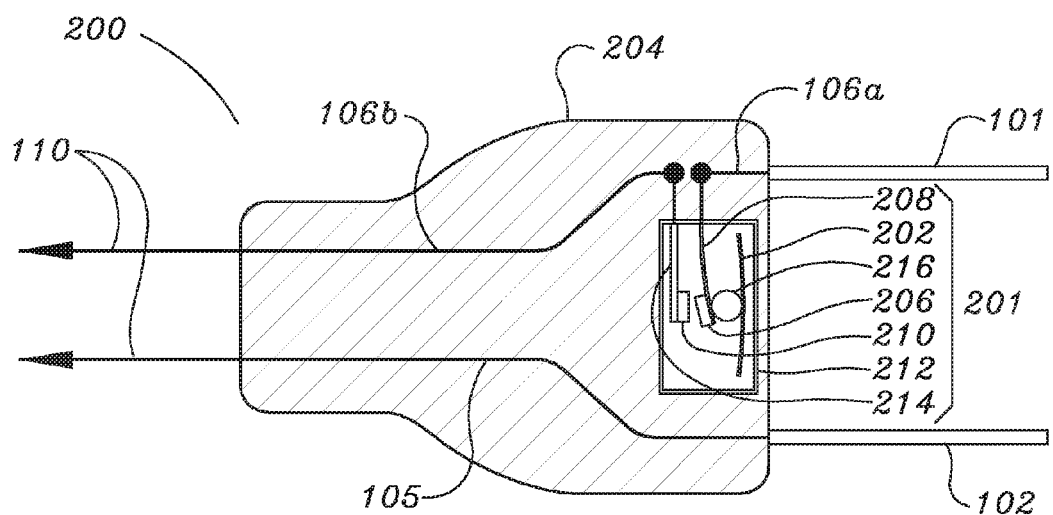

FIGS. 2A and 2B show an exemplary basic circuit utilizing electro mechanical components of thermal detection plug 200, according to an embodiment. The temperature of power source contact prongs 101, 102 and housing 204 is monitored by Thermal Cut Off (TCO) 201.

TCO 201 includes enclosure 212. Located within enclosure 212 is calibrated bi-metal strip or thermo disc 202 that bends in response to temperature. Contacts 206 and 210 are positioned on the ends of movable support 208 and stationary support 214 respectively. Bi-metal strip or thermo disc 202 actuates the movement of mechanical link 216.

Mechanical link 216 controls the position of contact 206 relative to contact 210 dependent on the state of bi-metal strip or disc 202.

Power source contact prong 101 is connected to line cord 110 via conductors 106a and 106b through TCO 201. Power source contact prong 102 is directly connected to line cord 110 via conductor 105. In an embodiment, thermal detection plug 200 is a polarized plug with a hot side and a neutral side. In an embodiment power source contact prong 101 is the hot side and prong 102 is the neutral side. It should be noted that polarization is not necessary for the device to operate properly.

Referring now to FIG. 2A, contacts 206 and 210 are closed, thus allowing the free flow of electricity from a power source (not shown) through thermal detection plug 200 and line cord 110. The state of bi-metal strip or thermo disc 202 maintains contacts 206 and 210 closed as long as the temperature experienced by bi-metal strip or thermo disc 202 does not exceed a pre-determined limit.

FIG. 2B shows contacts 206 and 210 opened, thus stopping the free flow of electricity from a power source (not shown). The temperature experienced by bi-metal strip or thermo disc 202 has exceeded a pre-determined limit, thus "bowing" bi-metal strip or thermo disc 202 away from contacts 206 and 210. Mechanical link 216 is allowed to move and a natural spring tension inherent in movable support 208 moves contact 206 away from contact 210.

Contacts 206 and 210 will return to closed after the temperature experienced by bi-metal strip or thermo disc 202 drops below the temperature required to "bow" bi-metal strip or thermo disc 202 toward contacts 206 and 210.

The exemplary basic circuit of thermal detection plug 200 shown in FIGS. 2A and 2B uses TCO 201 with simple bi-metal strip or disc 202, the invention however is not so limited. It is contemplated that other temperature detection devices may be used without departing from the spirit of the invention, such as, for example, TCOs with positive temperature coefficient (PTC) pellets for latching the contact in an opened and non-conductive state. It is also contemplated that manual reset features or buttons and the like may be used. A single shot, non-replaceable fuse can also be used in lieu of or in conjunction with TCO 201. As such, the appliance would be rendered non-operable if the single shot, non-replaceable fuse should experience a temperature above a pre-determined threshold.

One advantage associated with the use of TCO 201 with enclosure 212 is the ability to manufacture thermal detection plug 200 at a reasonable cost. Enclosure 212 can be used to effectively seal and protect bi-metal strip or disc 202, movable support 208, stationary support 214, contacts 206, 210, and mechanical link 216. TCO 201 can thereby be directly molded within housing 204 of thermal detection plug 200. The ability to directly mold housing 204 over TCO 201 allows conventional assembly techniques to be used, while avoiding specialized equipment or structures.

As can be appreciated, the flow of power through thermal detection plug 200 is controlled by the temperature experienced by bi-metal strip or disc 202, apart from the amount of current flowing through thermal detection plug 200. The current flow can affect the function of thermal detection plug 200, according to embodiments herein, by increasing the temperature or building up heat within housing 204. Heat may be built up or be absorbed from the power supply, the interface between thermal detection plug 200, and/or the power supply or within thermal detection plug 200.

The factors that contribute to heat buildup within the region of power source contact prongs 101, 102 may be for example: i) Poor electrical and/or mechanical connection within the power source, such as loose connections, corroded or faulty wire and the like; ii) Consumer abuse, such as for example, repeated plug insertion and removal while the unit is energized; and iii) Higher than normal amperage, causing localized heating at the interface between the power source and thermal detection plug 200; for example, a point of relatively small cross sectional contact area between power source contact prongs 101 and/or 102 and the receptacle of a conventional outlet.

Unlike conventional circuit breakers that use excess current flow to assume a thermal safety compromise, thermal detection plug 200 is able to directly determine if the connection between an appliance and a power supply is within safe temperature limits. The pre-determined safe temperature limits may be based on criterion regarding: materials, institutional electric codes, industrial practices, and the like.

In one embodiment the temperature at which the flow of electricity is interrupted is about 135° C. [275° F.] or greater. This temperature is less than the melting temperature of plastics used to fabricate the housings of conventional plugs and much lower than the 175° C. [350° F.] temperatures measured in the housing material during "faulty connection event" testing.

It should be noted that directly molding housing 204 over TCO 201 allows for consistent thermal transfer from housing 204 to TCO 201. Molding is a repeatable process which will allow TCO 201 to be precisely calibrated to assure that power will be interrupted as required for safety purposes.

Although thermal detection plug 200 is shown utilizing a single TCO 201 the invention is not so limited. It is contemplated that more than one TCO 201 or contact set 206, 210 may be used to control the flow of power from either of power source contact prongs 101, 102. It has also been contemplated that thermal detection plug 200 may be used in conjunction with current flow safety devices; such as for example fuses to further enhance the safety afforded by the invention.

FIG. 3A is an exploded perspective view of thermal detection plug 300. As shown housing 304 includes multiple portions: front 304a and rear 304b. When assembled, front 304a and 304b define internal space 305. As shown screws 308 are used to assemble front 304a and rear 304b together; however, the invention is not so limited. It is contemplated that adhesives, snaps, ultrasonic welding, and other fastening devices and systems may be used to assemble front 304a and rear 304b without departing from the spirit of the invention.

Line cord 110 enters internal space 305 and connects to TCO 301 via conductor 106b and connects to contact prong 102 via conductor 105. TCO 301 is connected to contact prong 101 via conductor 106a. As shown line cord 110 includes strain relief 112. Strain relief 112 engages with front 304a and rear 304b of housing 304 when assembled to securely line cord 110 in place where it enters internal space 305.

Prong base 330 is located within interior space 305. As shown, the use of prong base 330 is threefold: First, prong base 330 serves to structurally hold TCO 301 and contacts 101, 102 in proper location within the device. Second, in an embodiment, the material used to construct prong base 330 is electrically isolative and provides electrical isolation of the various components of thermal detection plug 300. Third, the material used to construct prong base 330 is able to conduct thermal energy while maintaining structural characteristics at elevated temperatures. It is contemplated that materials, such as for example, ceramics, phenolic, laminates, mineral filled plastics, and the like will be used to construct prong base 330. Thus, prong base 330 locates and electrically isolates the components while at the same time thermally connects the components of thermal detection plug 300. The thermal conductivity of prong base 330 allows a temperature rise to more easily affect TCO 301. Additionally, the above mentioned materials and the like are not subject to melting, softening and/or deformation at the 175° C. [350° F.] temperatures measured during "faulty connection event" testing.

Prong base 330 includes passages 332, holes 338, and surface 334. Contacts 101, 102 pass through passages 332 and are fastened to prong base 330 with rivets 336 via holes 338. Once fastened to prong base 330, contacts 101, 102 pass through respective opening slots 309 of the front portion 304a of the housing 304. It contemplated that, in an embodiment, contacts 101, 102 may be molded into prong base 330, thereby forming a unitary structure. TCO 301 may be mounted to surface 334 via rivets, screws, adhesives or snaps (not shown). Regardless of the fastening method utilized, close contact between surface 334 and TCO 301 is important to assure thermal transfer between prong base 330 and TCO 301.

FIG. 3B shows an embodiment of amperage fuse 306a that may be utilized in lieu of conductor 106a. In such an embodiment, thermal detection plug 300 not only detects a temperature change but also detects an excessive amperage draw through the system.

FIG. 4 is an exploded perspective view and FIG. 5 is an assembled view of sub-assembly 500. FIG. 4 shows line cord 110 connected to TCO 401 via conductor 106b and connected to contact prong 102 via conductor 105. As shown, TCO 401 is connected to and unitary with contact prong 101 via conductive bridge 406a. Prong base 430 includes passages 432, holes 438, and surface 434. Contacts 101, 102 pass through passages 432 and are fastened to prong base 430 with rivets 336 via holes 438. TCO 401 is mounted to surface 434 and cap 440 defines internal space 442.

As can be seen, conductive bridge 406a not only establishes an electrically conductive path but also establishes a thermally conductive path between TCO 401 and contact prong 101.

As shown in FIG. 5, cap 440 fits over TCO 401 and connects to prong base 430. As shown cap 440 snaps securely to prong base 430 while allowing TCO 401 to be located within interior space 442. As such, cap 440 protects TCO 401 from foreign materials that may interfere with the function of TCO 401. Such materials may include processing materials such as polymer or other materials such as dust and dirt. Although cap 440 is shown having a "snap" interface with prong base 430, the invention is not so limited. It is contemplated that 440 may be attached to prong base 430 with adhesives, screws, rivets and other conventional methods without departing from the spirit of the invention. It is also contemplated that cap 440 may be integrated into TCO 401 as a unitary component, such as a metal casing that would impede foreign materials from interfering with the function of TCO 401.

Figure 6:
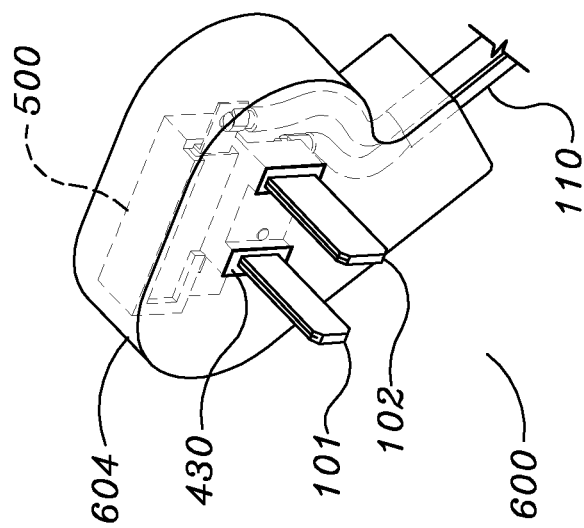

FIG. 6 is a perspective view showing the use of sub-assembly 500 in thermal detection plug 600. As shown thermal detection plug 600 includes housing 604. As shown housing 604 is an injection molded polymer which encapsulates sub-assembly 500. Contact prongs 101, 102 and line cord 110 are at least partially external to housing 604 via respective openings or slots through which contact prongs 101, 102 and line cord 110 pass. As shown line cord 110 exits housing orthogonal or substantially orthogonal to contact prongs 101, 102.

Figure 7:
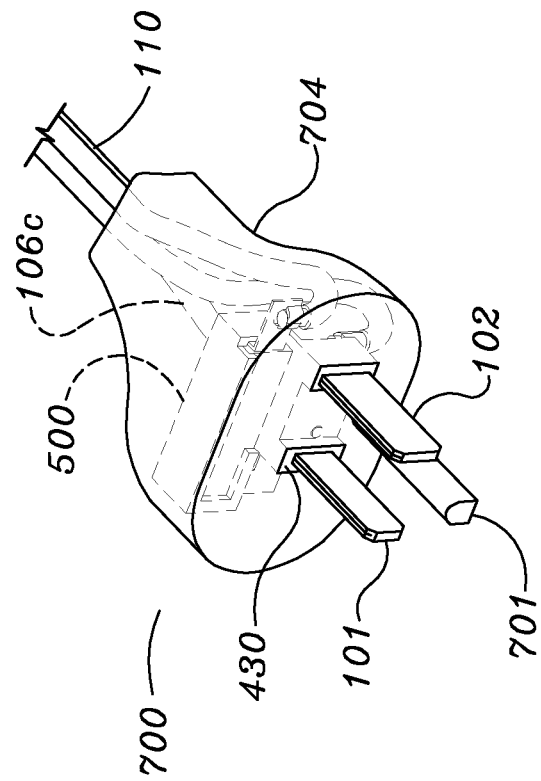
FIG. 6 and FIG. 7 are perspective views showing the assembly of FIG. 5 in thermal detection plugs, according to embodiments.

FIG. 7 is a perspective view showing the use of sub-assembly 500 in thermal detection plug 700, according to an additional embodiment. As shown thermal detection plug 700 includes housing 704. Similar to housing 604 of FIG. 6, housing 704 is an injection molded polymer which encapsulates sub-assembly 500. Contact prongs 101, 102, ground prong 701, and line cord 110 are at least partially external to housing 604 via respective openings or slots through which contact prongs 101, 102, ground prong 701, and line cord 110 pass. As shown line cord 110 exits housing in-line or substantially in-line to contact prongs 101, 102.

FIGS. 8A and 8B are views of thermal detection plug 800, according to another embodiment. FIG. 8A is a side view of thermal detection plug 800 showing power source contact prongs 822, 824 protruding from housing 810. FIG. 8B is a cross sectional view through thermal detection plug 800 along plane 8-8 shown in FIG. 8A. As shown thermal detection plug 800 is similar in function and structure to the embodiment shown in FIG. 3A.

TCO 801 includes resistance heater element 816 located proximate bimetallic strip 808. Contacts 206 and 210 are positioned on the ends of bimetallic strip 208 and stationary support 214, respectively. The normal operating condition of thermal detection plug 800 permits the free flow of electrical current between contacts 206 and 210 and subsequently through line cord 110. While in the "normal" operating condition, the majority of electrical current will flow through the path of least resistance, specifically through bimetallic strip 808, contacts 206, 210, and stationary support 214. The electrical resistive characteristics of resistance heater element 816 inhibits the flow of current through resistance heater element 816 while contacts 206 and 210 are together. In an overheated condition, bimetallic strip 808 reacts to an elevated temperature and moves contacts 206 away from 210. The absence of direct contact between contacts 206 and 210 does not permit the full flow of electricity into the appliance. When contacts 206 and 210 are open, the electric current attempts to flow through resistance heater element 816 via by-pass connection 814. The increased electrical current flow in resistance heater element 816 elevates the temperature of resistance heater element 816. The elevated temperature of resistance heater element 816 transfers thermal energy, through conductive contact, into bimetallic strip 808. Bimetallic strip 808 therefore remains in the condition of latched open and prevents "full flow" of electric current through line cord 110 until direct detection thermal plug 800 is disconnected from its power source (not shown) and allowed to cool. The cooling of the components of direct detection thermal plug 800 permits bimetallic strip 808 to return to its "normal" operating condition and closes contacts 206 and 210. Resistance heater element 816 may be a positive temperature coefficient (PTC) structure such as pellets, strips and the like.

As shown in FIG. 8B, contact prongs 822, 824 are fastened to prong base 330 with rivets 336. Thermal detection plug 800 also includes the addition of secondary safety component 840 within housing 810. As shown secondary safety component 840 is connected to line cord 110, contact prong 822 and TCO 801 via conductors 105, 106b, 805, and 806. As shown secondary safety component 840 may be for example an additional circuit interrupter. It is contemplated that secondary safety component 840 may include circuitry to affect one or more of the following: ground fault circuit interruption, arc fault circuit interruption, appliance leakage current interruption, over current circuit interruption (fuse), and the like. As can be appreciated the combination of TCO 801 with such current interruption components will enhance the overall safety of a device or electrical circuit. The ability to protect from thermal events, over current events, current leakage events, and arcing events is advantageous when compared to a conventional safety devices, such as for example household breakers or household fuses.

Figure 9:
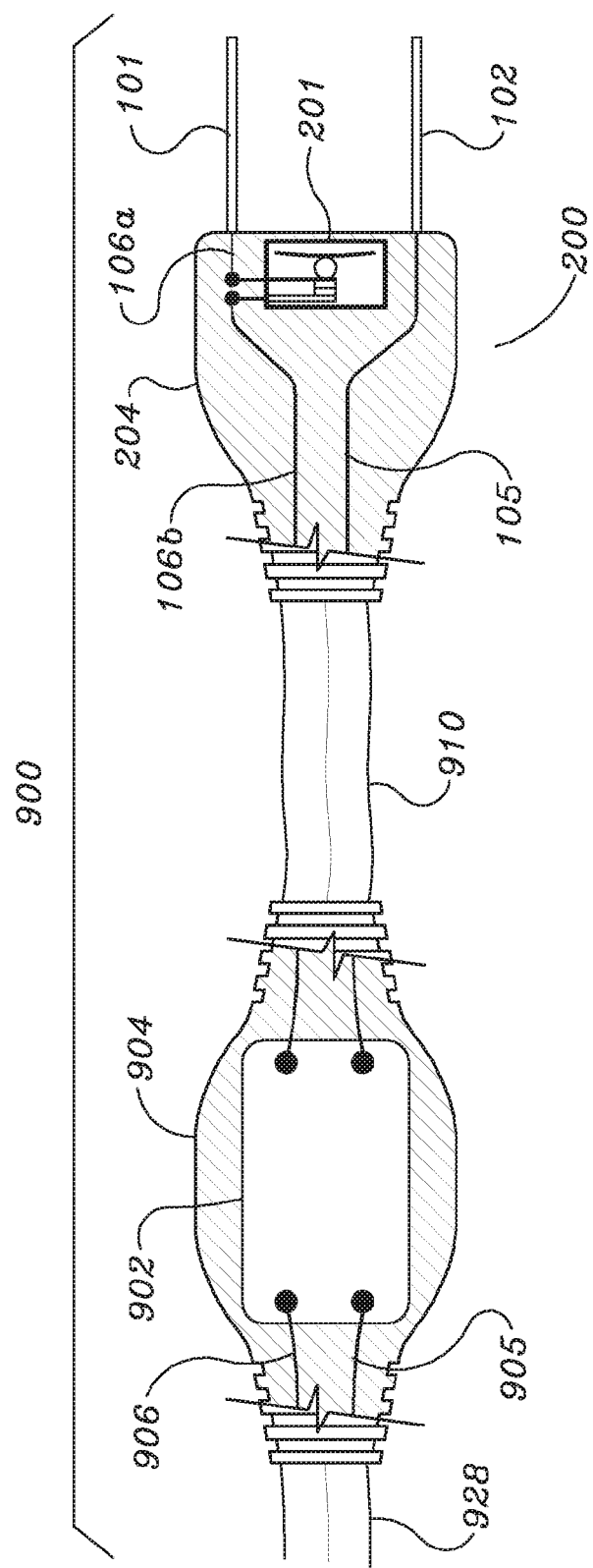
FIG. 9 is a view of another embodiment of a thermal detection plug.

FIG. 9 is a view of thermal detection plug 900, according to yet another embodiment. As shown thermal detection plug 900 is similar in function and structure to the embodiment shown in FIGS. 2A and 2B, except for the addition of secondary safety component 902 within housing 904. In particular, thermal detection plug 200 is shown and includes housing 204, TCO 201; also shown are conductors 105, 106a, and 106b, as well as prongs 101, 102. As shown secondary safety component 902 is similar to secondary safety component 840 of FIGS. 8A and 8B.

Housing 904 is non-unitary with housing 204. Conductors 106a and 105 electrically connect power source contact prongs 101 and 102 and TCO 201 to secondary safety component 902 via connection cord 910. Conductors 905 and 906 connect secondary safety component 902 to an electrical apparatus (not shown) via connection power cord 928. In all other aspects, thermal detection plugs 900 is similar to thermal detection plugs 200 of FIGS. 2A and 2B.

Although thermal detection plugs 100, 200, 300, 600, 700, 800, and 900 have been shown in conjunction with standard two or three terminal plugs for 120V AC electrical apparatuses, the invention is not so limited. It is contemplated the invention will apply to both AC and DC circuits. It is also contemplated that the invention will apply with two, three and four wire systems. Single and polyphase circuits will be equally well served with higher and lower voltages and various plug configurations.

Thermal detection plugs 100, 200, 300, 600, 700, 800, and 900 have been shown in conjunction with standard male terminal plugs; it is however contemplated that the device could be used in female receptacles, such as a wall receptacle. Also contemplated is the use of features of thermal detection plugs 100, 200, 300, 600, 700, 800 and 900 on one or both ends of an extension cord or power tap having a male plug at the first end and a female receptacle at the second end.

Figure 10:
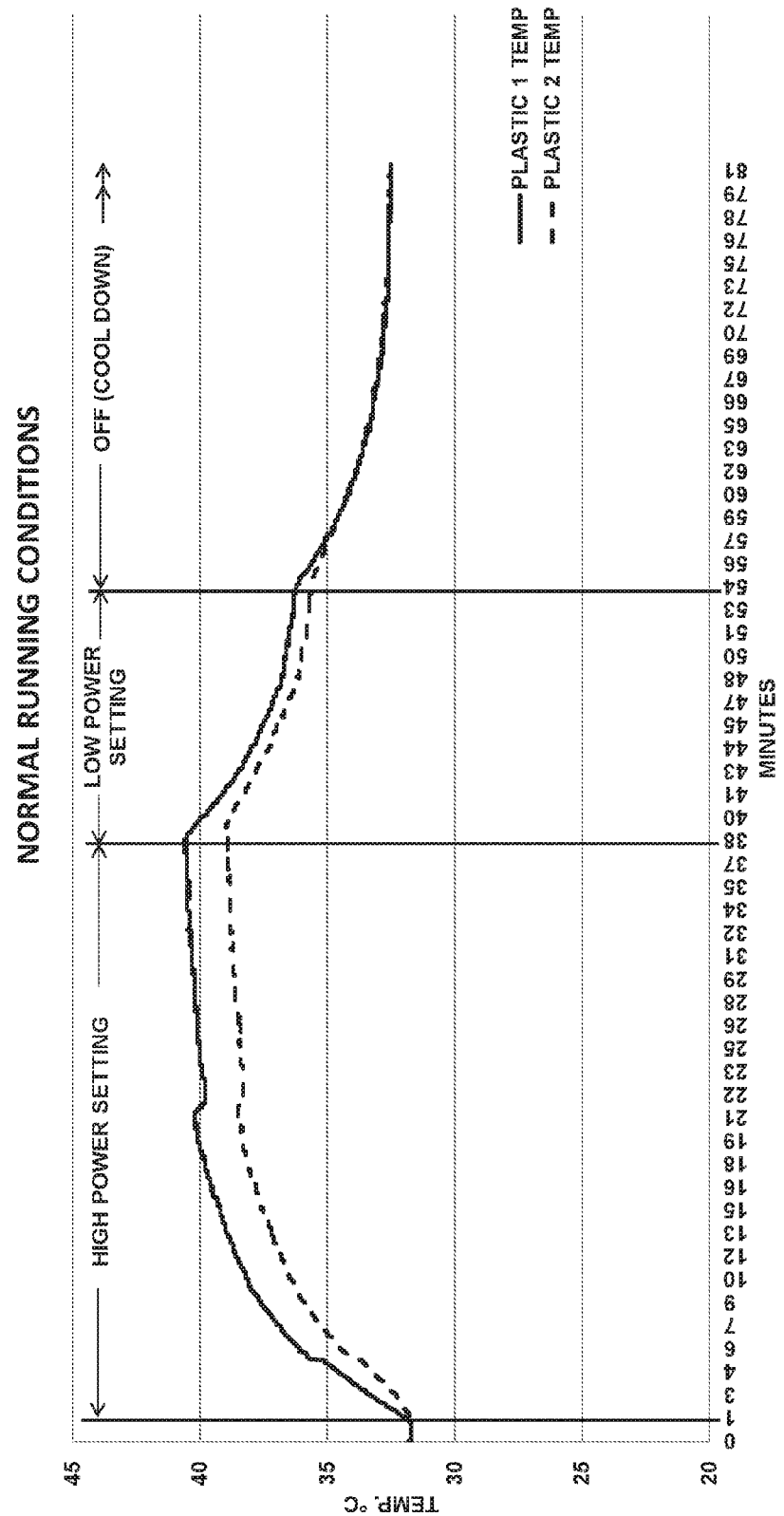
FIG. 10 is a graph showing the temperature profile under normal conditions of a conventional appliance plug.

FIG. 10 is a graph showing the temperature profile under normal conditions for a conventional appliance plug. Two temperature probes were inserted into a plug of a conventional 1500 watt heater. As shown, on high setting the temperature of the polymer in the plug reached a maximum temperature of approximately 40° C. [104° F.]. This temperature is well below the Vicat softening temperature of major polymers, specifically the most widely used polymer for power cords and plugs, Polyvinyl Chloride (PVC). The Vicat softening temperature of PVC is 92° C. [197° F.].

Figure 11:
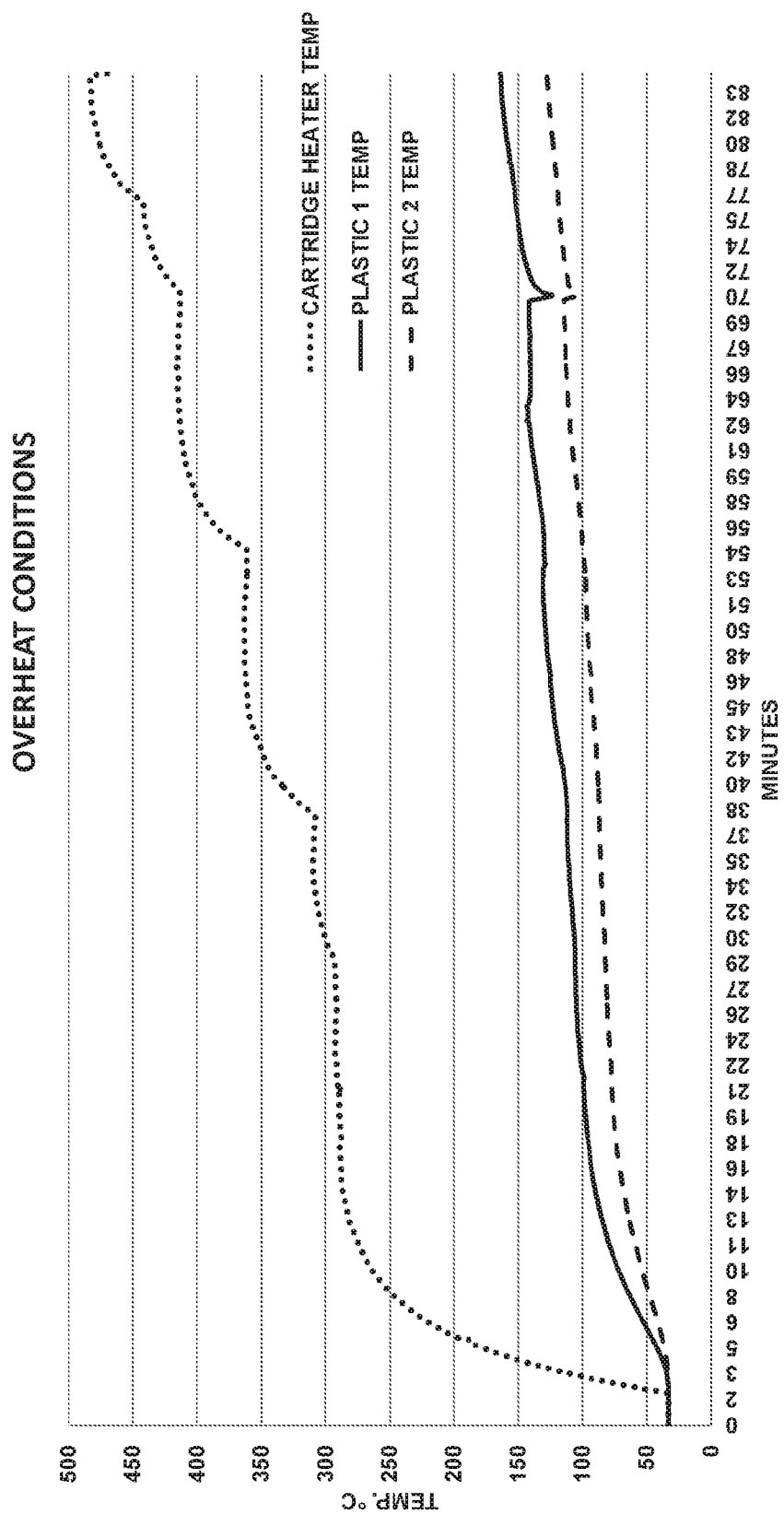
FIG. 11 is a graph showing the temperature profile of a conventional appliance plug under high temperature conditions.

FIG. 11 is a graph showing the temperature profile of a conventional appliance plug under a high temperature conditions. In order to replicate the conditions of a faulty connection between a prong of a conventional appliance plug and the receptacle terminals of a conventional wall outlet, a cartridge heater was connected to the receptacle terminals of a wall outlet. The heat from the cartridge heater was transferred into the receptacle terminals and subsequently into contact prongs of the conventional appliance plug. As the cartridge heater temperature increased, the temperature of the polymer was monitored similar to FIG. 10. The polymer reached the Vicat softening temperature of PVC (92° C. [197° F.]) at about 18 minutes into the test. The temperature of the polymer continued to build until reaching approximately 160° C. [320° F.] when the test was terminated. The resultant high temperatures cause the polymer to soften and degrade the structural ability of the polymer to hold the prongs and other components in proper location.

As can be appreciated, as the polymer temperatures approach 160° C. [320° F.], it is more difficult to touch the plug because of the heat build-up. Should the user become aware of the overheating condition, the high temperature of the plug will prevent the ability to manually remove the plug from the wall outlet.

Figure 12:
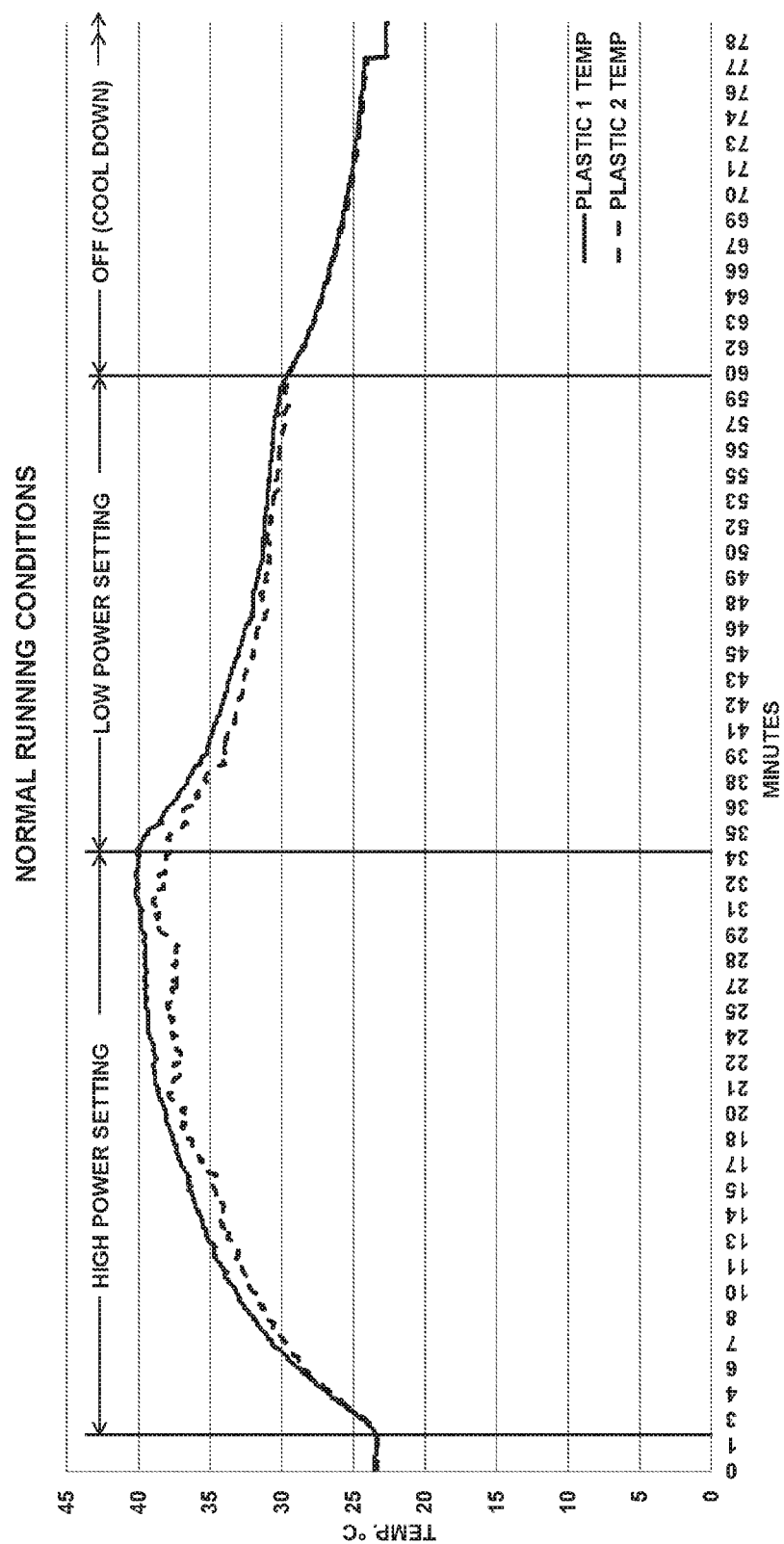
FIG. 12 is a graph showing the temperature profile under normal running conditions of a thermal detection plug, according to embodiments herein.

FIG. 12 is a graph showing the temperature profile under normal conditions for thermal detection plug 300 of FIG. 3A. Thermal detection plug 300 was connected to a conventional 1500 watt heater for the test. Two temperature probes were attached to Thermal detection plug 300. As shown on high setting the temperature of the polymer in the plug reached a maximum temperature of approximately 40° C. [104° F.]. This temperature is well below the Vicat softening temperature of Polyvinyl Chloride (PVC).

Figure 13:
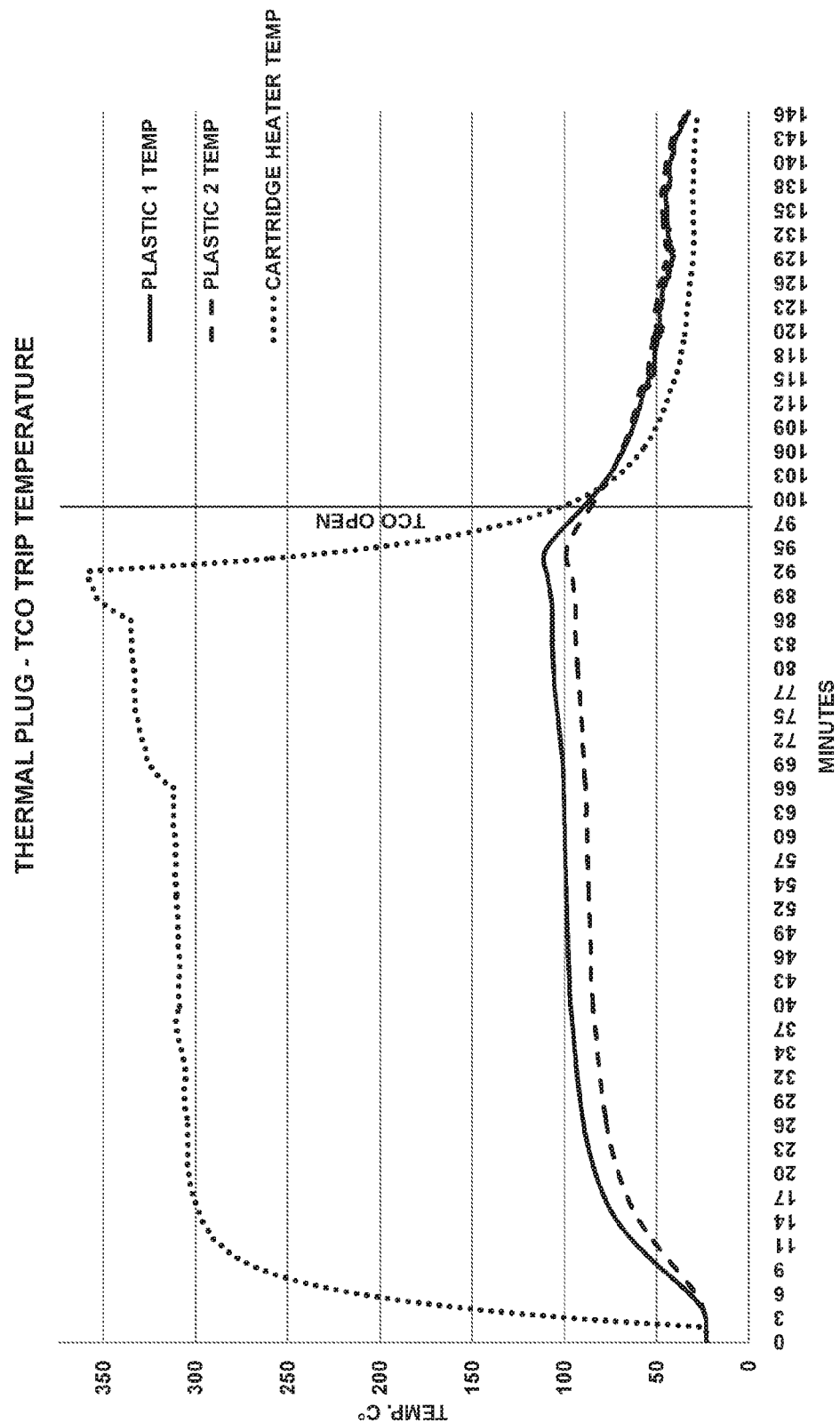
FIG. 13 is a graph illustrating the temperature profile under high temperature conditions of a thermal detection plug, according to embodiments herein.

FIG. 13 is a graph showing the temperature profile of thermal detection plug 300 under high temperature conditions. The high temperature conditions were replicated similar to the conditions of FIG. 11. The heat from the cartridge heater was transferred into the receptacle terminals and subsequently into contact prongs 101 and 102 of thermal detection plug 300. As the temperature of contact prongs 101 and 102 increased, the temperature of the polymer was monitored similar to FIG. 12. As the temperature of the cartridge heater approached approximately 350° C. [662° F.], the polymer temperature reached the Vicat softening temperature of PVC (92° C. [197° F.]). Under the described conditions, TCO 301 in thermal detection plug 300 opened the electrical circuit. In a real world condition, once TCO 301 opens the electrical circuit the electrical draw is removed from the system (i.e., turning off the cartridge heater), and the polymer began to cool down to below the Vicat softening temperature.

As can be appreciated, the use of thermal detection plug 300 maintains the structural integrity of the polymer unlike the conventional appliance plug as shown in FIG. 11. Also, the user can manually remove thermal detection plug 300 from the wall outlet without the excessive temperature risk.

In one embodiment, the pre-determined limit, meaning the temperature of the plug structure (i.e., the temperature of the polymer) at which TCO 201 opens the electrical circuit to stop the free flow of electricity from the power source, is equal to or greater than 80° C. [176° F.]. In another embodiment, the pre-determined limit is within a range between 80° C. [176° F.] and 125° C. [257° F.].

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

We claim:

1. A power supply cord with thermal detection for use with an electrical appliance comprising:
   a first and second conductor, having a first end of said first and second conductors attach as a unitary assembly to said electrical appliance and a second end of said first and second conductors attach as a unitary assembly to a thermal detection plug; said thermal detection plug comprising:
   a housing, wherein said second end of said first and second conductors enter and attach to said housing;

a first contact prong at least partially disposed within said housing and protruding from said housing and electrically connected to said second end of said first conductor;

a second contact prong at least partially disposed within said housing and protruding from said housing and electrically connected to said second end of said second conductor;

a thermal cut off (TCO) disposed within said housing and in connected electrical series between said first contact prong and said first conductor;

a thermally stable and electrically isolative prong base at least partially disposed within said housing, wherein said housing, said first and second contact prongs and said TCO contact said prong base and allows thermal conductivity to occur between one or more of said housing, said first contact prong, said second contact prong, said prong base, and said TCO;

an electrical current path capable of carrying an electric load through said first contact prong, said TCO, and said first conductor; and wherein said TCO opens said connected electrical series between said first contact prong and said first conductor thereby disrupting said electrical current path in response to a temperature rise of said conductors, said contact prongs, said housing, or said prong base above a pre-determined temperature limit.

2. The power supply cord of claim 1, wherein said TCO opens irrespective of an increase of an electrical current load passing through said electrical current path.

3. The power supply cord of claim 1, wherein said temperature rise is not dependent upon a corresponding rise of an electrical current load passing through said electrical current path.

4. The power supply cord of claim 1, wherein said TCO further comprises a reset mechanism configured to reset said TCO subsequent to opening said connected electrical series.

5. The power supply cord of claim 4, wherein said reset mechanism automatically restores said connected electrical series after said TCO experiences a temperature below said pre-determined temperature limit.

6. The power supply cord of claim 4, wherein said TCO includes a resistance heater configured to maintain an open condition of said connected electrical series until said thermal detection plug is disconnected from a power source.

7. The power supply cord of claim 1, wherein said TCO further comprises a single use TCO configured to be replaced subsequent to opening said connected electrical series.

8. The power supply cord of claim 1, wherein said TCO further comprises a single use TCO, wherein subsequent to opening said connected electrical series, said connected electrical series cannot be restored, rendering inoperable said electrical appliance.

9. The power supply cord of claim 1, wherein said housing comprises a unitary injection molded polymer component, wherein said first and second contact prongs, said first and second conductors, said prong base and said TCO are at least partially over-molded by said housing and maintained in locational relationship to each other by said housing.

10. The power supply cord of claim 1, wherein said TCO is unitary with said first contact prong or said second contact prong.

11. The power supply cord of claim 1, further comprising; a second TCO disposed within said housing and located in a second connected electrical series between said second contact prong and said second conductor;

wherein said second TCO opens said second connected electrical series between said second contact prong and said second conductor in response to said pre-determined temperature limit.

12. The power supply cord of claim 1, wherein said pre-determined temperature limit at which said TCO opens is equal to or above 80° C. [176° F.].

13. The power supply cord of claim 1, wherein said prong base comprises a material that is one or more of a mineral based ceramic and a mineral filled polymer.

14. The power supply cord of claim 1, further comprising a polarized plug having a hot side and a neutral side, wherein said first contact prong comprises said hot side and said second contact prong comprises said neutral side.

15. The power supply cord of claim 1, wherein said housing comprises multiple portions assembled together to define an internal space, wherein said first and second contact prongs, said prong base and said first and second conductors are at least partially disposed within said internal space, and wherein said TCO is disposed within said internal space and said prongs, said prong base, said conductors, and said TCO are held in place in relation to one another when said multiple portions are assembled together.

16. The power supply cord of claim 1, wherein said electrical appliance is a space heater.

17. A method for improving the safety of an electrical appliance the method comprising:
providing a power cord with thermal detection comprising:
a first and second conductor, each of said first and second conductors having a first end and a second end;
electrically connecting said first end of said first and second conductors to said electrical appliance;
connecting a thermal cut off (TCO) to said second end of said first conductor;
connecting a first contact prong to said TCO;
connecting a second contact prong to said second end of said second conductor;
connecting said TCO to said first contact prong and said second contact prong to a thermally stable and electrically isolative prong base;
disposing at least a portion of said first and second conductors, said TCO, said prong base said first contact prong and said second contact prongs in a housing;
connecting said appliance, said conductors, said TCO, said prongs, said prong base, and said housing unitarily in a permanent functional assembly;
connecting said power cord with thermal detection via said first and second contact prongs to a power supply;
establishing a first electrical connection between said power supply and said electrical appliance through said first contact prong and subsequently through said TCO, said second end of said first conductor, and said first end of said first conductor;
establishing a second electrical connection between said power supply and said electrical appliance through said second contact prong and subsequently through said second end of said second conductor and said first end of said second conductor;

determining a temperature limit at which said TCO opens said first electrical connection between said power supply and said electrical appliance;

disrupting a flow of energy from said power supply to said electrical appliance by opening said TCO at said pre-determined temperature;

wherein said TCO opens in response to a temperature rise of said conductors, said prongs, said prong base or said housing irrespective of an increase or decrease of an electrical current load passing through said first and second electrical connections.

18. The method of claim 17, wherein said housing is at least partially constructed of an injection molded polymer and over-molds at least a portion of said first and second contact prongs, said first and second conductors, said prong base and said TCO and maintains a locational relationship of said first and second contact prongs, said prong base, said first and second conductors, and said TCO relative to each other.

19. The power supply cord of claim 15 wherein said multiple portions of said housing cannot be disassembled by using conventional tools.

20. The power supply cord of claim 15 wherein said multiple portions of said housing cannot be disassembled without rendering said thermal detection plug inoperable.

21. A power supply cord with thermal detection for use with an electrical appliance comprising a first and second conductor, having a first end of said first and second conductors attach as a unitary assembly to said electrical appliance and a second end of said first and second conductors attach as a unitary assembly to a thermal detection plug; said thermal detection plug comprising:

a first contact prong electrically connected to said second end of said first conductor;

a second contact prong electrically connected to said second end of said second conductor;

a thermal cut off (TCO) in connected electrical series between said first contact prong and said first conductor;

an electrical current path capable of carrying an electric load through said first contact prong, said TCO, and said first conductor;

a housing comprising:

a unitary injection molded component, wherein said second end of said first and second conductors, said first and second contact prongs, and said TCO, are over-molded by said housing and held in locational relationship to each other by said housing; and wherein said TCO opens said connected electrical series between said first contact prong and said first conductor thereby disrupting said electrical current path in response to a temperature rise of said conductors, said prongs or said housing above a pre-determined temperature limit.

22. The power supply cord of claim 21, further comprising a thermally stable and electrically isolative prong base at least partially disposed within said housing, wherein said first and second contact prongs and said TCO contacts said prong base to allow thermal conductivity to occur between one or more of said first contact prong and said second contact prong, said prong base, and said TCO.

23. The power supply cord of claim 22, wherein said prong base comprises a material that is one or more of a mineral based ceramic and a mineral filled polymer.

24. The power supply cord of claim 21, wherein said TCO is unitary with said first contact prong.

25. The power supply cord of claim 21, wherein said TCO opens irrespective of an increase of an electrical current load passing through said electrical current path.

* * * * *